United States Patent [19]

Wood et al.

[11] 3,942,220

[45] Mar. 9, 1976

[54] CASTER SLEEVE

[75] Inventors: Leroy J. Wood, Chicago; Edward J. Zych, Des Plaines, both of Ill.

[73] Assignee: Haydock Caster Company, Niles, Ill.

[22] Filed: Nov. 21, 1974

[21] Appl. No.: 525,918

[52] U.S. Cl. .................................................. 16/43
[51] Int. Cl.² ........................................... A47B 91/00
[58] Field of Search ........................................ 16/43

[56] References Cited
UNITED STATES PATENTS

| | | | |
|---|---|---|---|
| 1,125,272 | 1/1915 | Diss | 16/43 |
| 1,649,528 | 11/1927 | Herold | 16/43 |
| 3,015,124 | 1/1962 | Haydock | 16/43 |

Primary Examiner—Patrick D. Lawson
Attorney, Agent, or Firm—Paul H. Gallagher

[57] ABSTRACT

A sleeve for a caster, insertable into a cavity or hole in a furniture leg; the sleeve is generally tubular with a closed upper end and an open lower end; the sleeve is slotted longitudinally, forming diametrically opposed legs which are flexible toward and from each other; the legs have upper and lower prongs, the upper ones projecting upwardly and the lower ones projecting downwardly, both biting into the surface of the cavity and aiding in normally retaining the sleeve in the cavity; the upper prongs also releasably retain the caster stem in the sleeve; it also has transverse slots at the closed upper end communicating with the longitudinal slots.

7 Claims, 7 Drawing Figures

U.S. Patent  March 9, 1976  3,942,220
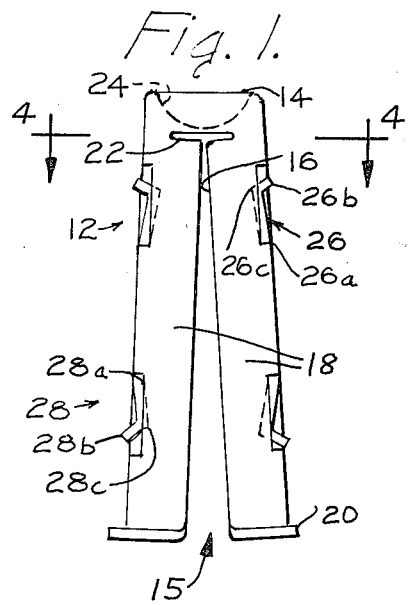
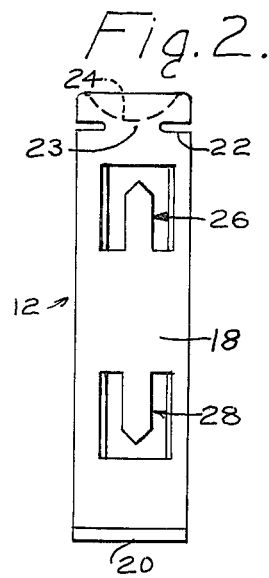
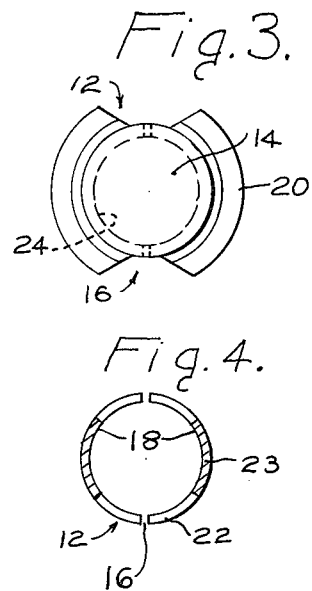
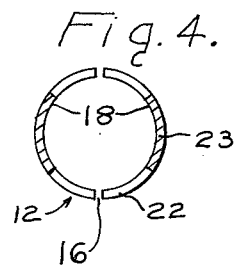
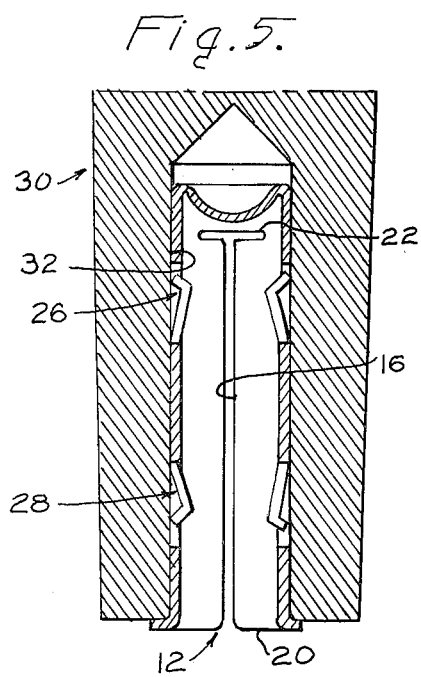
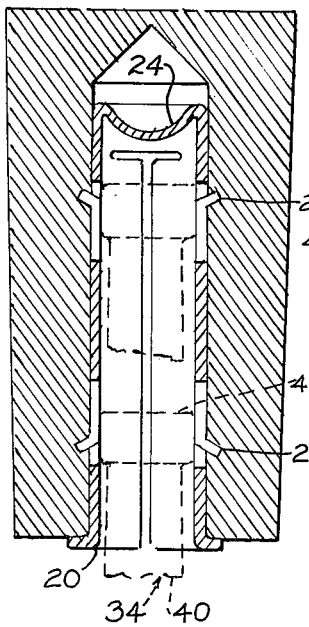
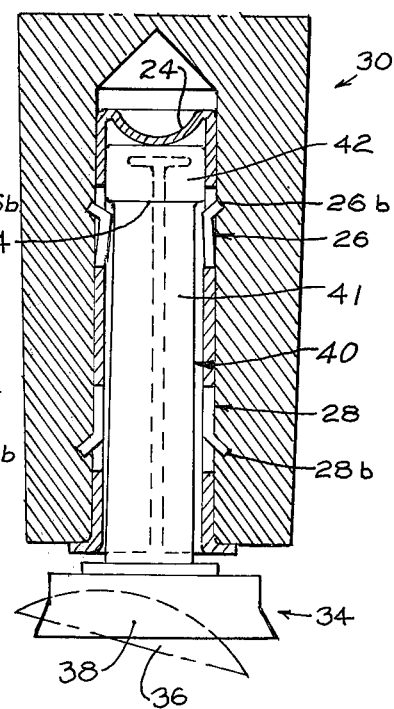

CASTER SLEEVE

PERTINENT PRIOR ART

U.S. Patent No. 3,015,024, Haydock, Jan. 2, 1962.

OBJECTS OF THE INVENTION

A broad object of the invention is to provide a caster sleeve which is unusually effective in cooperation with the furniture piece in which it is used in retaining the sleeve in position therein.

Another broad object is to provide a caster sleeve of the kind noted, including a novel construction which is unusually effective for releasably retaining the caster in the sleeve.

Another object is to provide such a caster sleeve which includes a pair of longitudinally extending legs, and having a novel construction in the form of transverse slots, which provide greater flexibility of the legs of the sleeve, while nevertheless possessing greater strength.

Still another object is to provide a caster sleeve of very simple construction and corresponding inexpensiveness, and as effective as previously known more complex devices, such as multiple-piece devices.

DESCRIPTION OF A PREFERRED EMBODIMENT

In the drawings:

FIG. 1 is a side elevational view of a caster sleeve made according to the present invention;

FIG. 2 is also a side elevational view of the caster sleeve, but taken at right angles to that of FIG. 1;

FIG. 3 is an end view of the device taken from the top of FIG. 1, but omitting certain details such as the tips of the prongs;

FIG. 4 is a sectional view taken at line 4—4 of FIG. 1;

FIG. 5 is a vertical and longitudinal sectional view of a furniture leg with the caster sleeve inserted in the cavity in the furniture leg, oriented according to FIG. 1, and showing the condition of the caster sleeve when first inserted, but without the caster inserted in the sleeve;

FIG. 6 is a view similar to FIG. 5 but indicating the stem of the caster in the sleeve, in each of two different positions and showing the position of the prongs of the sleeve penetrating into the material of the furniture leg in response to the positioning of the caster stem in corresponding postions in the sleeve; and FIG. 7 is a view similar to FIGS. 5 and 6 but showing the caster in full lines and in fully inserted position in the sleeve.

Referring in detail to the drawings, the caster sleeve is indicated as a whole at 12 and is preferably made of steel, forming a shell, stamped or otherwise shaped, and generally tubular in form. The sleeve has a closed upper end 14 and an open lower end 15. The sleeve is slotted or split by longitudinal slots 16 from a position adjacent the closed upper end extending to and through the open lower end, forming a pair of opposed longitudinal and downwardly extending legs 18 which are flexible toward and from each other. The legs are of arcuate form as shown in FIGS. 3 and 4, and they are pre-biased apart so as to normally diverge downwardly as indicated in FIG. 1. The legs may be symmetrical and the same in detail structure and shape, and at their lower ends include radial flanges 20 as will be referred again hereinbelow.

The sleeve is provided with transverse slots 22 on opposite sides spaced downwardly from the upper end 14 and communicating with the longitudinal slots 16. The transverse slots 22 each may be on the order of one-fourth to one-third of the circumferential dimension of the sleeve, leaving connecting pieces 23 therebetween, this dimension of the slots not being critical and may be more or less than the limits mentioned. The slots 22, communicating with the longitudinal slots 16, provide the legs 18 with more flexibility than would be provided without them. Reference will be made again hereinbelow to these transverse slots and the longitudinal slots, in the positioning of the sleeve in the cavity in the furniture leg.

The closed upper end 14 of the sleeve is provided with a downwardly extending projection 24 for engagement by the upper end of the caster stem as will be referred to again hereinbelow.

Each of the sleeve legs 18 is provided with an upper prong 26 and a lower prong 28, which are struck from the body of the sleeve and are similar in construction and shape, but the upper prongs extend upwardly and the lower prongs extend downwardly. The upper prongs each includes a main portion 26a connected to and extending from the body of the sleeve leg, and a pointed portion 26b at the free end of the portion 26a. The prongs include elbows 26c and the prongs are pre-biased so that the elbows are normally disposed inwardly from the corresponding inner surface of the sleeve, and the prong points 26b extend diagonally outwardly adjacent to or beyond the outer surface of the sleeve.

The prongs 28 similarly, each includes a main portion 28a, a point 28b, and an elbow 28c, and in this case also the elbows 28c are disposed inwardly of the inner surface of the sleeve, while the outer points 28b extend outwardly beyond the outer surface of the sleeve.

FIGS. 5–7 each shows a furniture piece or leg 30 having a cavity 32 therein. The cavity 32 may be close to the cylindrical in shape, but the caster sleeve as indicated above in its normal condition diverges downwardly. When the sleeve is inserted into the cavity, the sleeve conforms to the shape of the cavity, and thus assumes a generally cylindrical shape. In the insertion operation, the prongs 26, 28, and particularly the points 26b, 28b thereof, engage the wall of the cavity but they are flexed inwardly thereby and ride along the wall without materially penetrating thereinto. The sleeve is driven fully into the cavity until limited by the flanges 20 engaging the lower end of the furniture leg.

A caster 34 of known type is shown in FIG. 7 and includes a wheel 36, a yoke 38 and a stem or pintle 40, the latter having a shank 40 and a head 42 at the upper end of the shank, of larger diameter than the immediately adjacent portion of the shank, forming a shoulder 44.

After the caster sleeve is inserted into position as indicated in FIG. 5, the caster 34 is inserted into the sleeve as indicated in FIG. 6, and as the head 42 of the stem engages the lower prongs 28, it forces the points 28b outwardly into the material of the cavity wall which in many cases is wood. This secures the sleeve in the cavity because of the downward divergence of the points. This positioning of the prong points aids in retaining the sleeve in the cavity. The diameter of the head 42 of the stem is nearly that of the inner surface of the sleeve, and when the stem is inserted into the sleeve, the head pushes the prongs 28 outwardly so that the points penetrate into the cavity wall, but the relative dimensions of the head and the sleeve are such that there is still permitted a sliding action between the head and the sleeve.

As the head 42 then approaches the upper prongs 26 and engages them, it similarly pushes the points 26b outwardly into the material of the cavity wall. The caster stem is then moved further into the sleeve until it engages the projection 24 which limits the movement of the stem into the sleeve, and the projection forms the limiting support for the caster in the sleeve.

The prong points 26b are preferably of lesser radial extent than the prong points 28b, the latter serving as the main means for securing the sleeve in the cavity. The prongs 26 also aid in this function, but they also act to normally retain the caster in the sleeve, being so dimensioned that as the head 42 of the caster stem passes by those prongs, they are not fully projected outwardly beyond the inner surface of the sleeve, thus providing a projection, although a very slight projection, engaged by the head of the stem, which thereby prevents the caster from normally falling out of the sleeve. However, the caster can be withdrawn by applying greater force, either by pulling on the caster manually, or applying a tool such as a screw driver to pry the caster out. The lower prongs 28 may also serve the purpose of normally retaining the caster in the sleeve, although this is not their primary purpose. The prongs 28 preferably are larger than the prongs 26, and because of the inclination of the prong points 28b as referred to above, they are more effective for retaining the sleeve in the cavity.

The transverse slots 22 are found very effective in providing greater flexibility of the legs 18 of the sleeve. The arcuate shape of the legs works against their normal flexibility, but the transverse slots 22 provide greater flexibility, but they do not impair the effective strength of the sleeve, because the sleeve is confined in the cavity and various transverse forces encountered do not materially come into play, and the strength necessary for the sleeve is that provided by the longitudinal dimension of the sleeve, and the interconnecting pieces 23 between the transverse slots.

The present construction supplants the constructions of previously known devices, which were more complex, such for example, as each including three main parts, namely, an outer sleeve, an inner sleeve, and a washer. The outer sleeve was held in position in the cavity by its contact with the wall of the cavity, the inner sleeve was held in the outer sleeve by purling it to the outer sleeve, and the washer was positioned at the bottom of the two sleeves, which was engaged by the yoke of the caster. In the present instance the sleeve is of integral and unitary form, being retained in the cavity by its own engagement with the wall of the cavity, and also serving to retain the caster in the sleeve.

The construction of the present caster sleeve also has been found to be of smaller diameter and stronger than most other previously known sleeves, considering any given size of caster, because of the integral and unitary construction, and its ability to retain the sleeve in the cavity and also to retain the caster in the sleeve. Additionally the transverse slots 22 enable relatively greater contraction of the legs of the sleeve for any given size of caster and sleeve, so as to be capable of full effectiveness in a minimum diameter cavity.

We claim:

1. A caster sleeve for use in conjunction with a caster having a stem with a head on a shank, the head being of greater diameter than the immediately adjacent portion of the shank, comprising,
   a generally tubular integral sleeve adapted for insertion into a cavity in a furniture piece and having a closed upper end and an open lower end, the closed upper end being continuous through its transverse extent,
   the sleeve being slotted longitudinally on diametrically opposite sides from a position adjacent the closed upper end to and through the open lower end forming a pair of diametrically opposite legs flexible toward and from each other,
   the legs including upper and lower prongs struck from the integral portions of the legs, the prongs having points normally adjacent the outer surface of the sleeve and elbows normally extending inwardly of the inner surface of the sleeve, whereby in response to insertion of the caster stem into the sleeve, the head of the stem forces the prongs outwardly into penetrating engagement with the wall of the cavity, and the elbows of the upper prongs remain at least slightly inwardly of the inner surface of the sleeve and releasably retain the caster in the sleeve.

2. A caster sleeve according to claim 1 wherein the sleeve includes transverse slots adjacent to but spaced downwardly from the closed upper end providing added flexibility of the legs toward and from each other.

3. A caster sleeve according to claim 2 in which the legs of the sleeve are arcuate in transverse section.

4. A caster sleeve according to claim 1 in which the lower prongs extend farther outwardly in radial direction than the upper prongs, and the lower prongs serve principally in retaining the sleeve in the cavity.

5. A caster sleeve for use in conjunction with a caster having a stem with a head on a shank, the head being of greater diameter than the immediately adjacent portion of the shank, comprising,
   a generally tubular integral shell adapted for insertion into a cavity in a furniture piece and having a closed upper end and an open lower end, the closed upper end being continuous throughout its transverse extent,
   the shell being split longitudinally by slots on diametrically opposite sides extending from a position adjacent the closed upper end to and through the open lower end, forming a pair of diametrically opposite legs flexible toward and from each other,
   the shell having transverse slots adjacent to but spaced downwardly from the closed upper end communicating with the longitudinal slots, and
   the legs having prongs struck from the integral portions of the legs, the prongs having points adjacent the outer surface of the shell as formed by the legs and projectable into the material of the furniture piece for normally retaining the sleeve in the cavity of the furniture piece and the caster in the sleeve.

6. A caster sleeve according to claim 5 in which the transverse slots communicate with the longitudinal slots.

7. A caster sleeve according to claim 6 in which the transverse slots each occupies in the neighborhood of between 1/4 and 1/3 of the circumferential extent of the sleeve.

* * * * *